US009962855B2

(12) United States Patent
Campbell et al.

(10) Patent No.: US 9,962,855 B2
(45) Date of Patent: May 8, 2018

(54) THREE-DIMENSIONAL PRINTING

(71) Applicants: Matthew Dwain Campbell, Austin, TX (US); Tyler Ray Ortego, Metairie, LA (US); Robert Leon Beine, Lancaster, KY (US); Steven G. Hall, Raleigh, NC (US)

(72) Inventors: Matthew Dwain Campbell, Austin, TX (US); Tyler Ray Ortego, Metairie, LA (US); Robert Leon Beine, Lancaster, KY (US); Steven G. Hall, Raleigh, NC (US)

(73) Assignee: Coastal Resilience Group, L.L.C., Metairie, LA (US)

( * ) Notice: Subject to any disclaimer, the term of this patent is extended or adjusted under 35 U.S.C. 154(b) by 25 days.

(21) Appl. No.: 15/264,384

(22) Filed: Sep. 13, 2016

(65) Prior Publication Data

US 2018/0071948 A1    Mar. 15, 2018

(51) Int. Cl.
| | | |
|---|---|---|
| *B28B 1/00* | (2006.01) | |
| *B28B 7/46* | (2006.01) | |
| *B29C 64/165* | (2017.01) | |
| *B33Y 10/00* | (2015.01) | |
| *B33Y 70/00* | (2015.01) | |
| *B33Y 30/00* | (2015.01) | |

(52) U.S. Cl.
CPC ............... *B28B 1/001* (2013.01); *B33Y 10/00* (2014.12); *B33Y 30/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 6,423,255 | B1 | 7/2002 | Hoechsmann et al. |
| 7,435,367 | B2 | 10/2008 | Oriakhi |
| 2005/0046067 | A1 | 3/2005 | Oriakhi et al. |
| 2008/0145639 | A1 | 6/2008 | Sun et al. |
| 2014/0117584 | A1 | 9/2014 | Khoshnevis et al. |

OTHER PUBLICATIONS

Rael, Ronald, Developing Concrete Polymer Building Components for 3D Printing, date unknown.
T. Harianto et al., Biogrouting Stabilization on Marine Sandy Clay Soil, Proceedings of the 7th International Conference on Asian and Pacific Coasts, Sep. 24-26, 2013.
Hayward Baker, Jet Grouting, Pub. No. G32, 2011.
Search Report and Written Opinion for related case PCT/US2017/051260 dated Nov. 28, 2017.

*Primary Examiner* — Mary Lynn F Theisen
(74) *Attorney, Agent, or Firm* — John B. Edel; Edel Patents LLC

(57) ABSTRACT

Methods and equipment are disclosed relating to three-dimensional printing that include positioning an array of nozzles within a bed of loose solid material, moving the array of nozzles through the bed of loose solid material while injecting a liquid from the array of nozzles in a controlled pattern causing the liquid to react with a portion of the bed of loose solid material forming a solid concrete three-dimensional object. An unreacted portion of the bed of loose solid material may then be separated from the solid three-dimensional object.

18 Claims, 2 Drawing Sheets

THREE-DIMENSIONAL PRINTING

Three-dimensional printing methods and apparatus described herein may be used in the creation of three-dimensional objects. Certain three-dimensional printing apparatus disclosed herein may efficiently produce three-dimensional objects having customized boundaries from a bed of material without the need for customized forms.

DETAILED DESCRIPTION

Example 1

The present example is directed to a method in which a three-dimensional object is created or printed inside of a bed of loose material and includes a description of the apparatus used to perform the method. Substantial portions of that loose material harden with the aid of a chemical reaction causing the formation of a three-dimensional object in the bed and the three-dimensional object is allowed to harden while supported by the remainder of the bed that is unreacted. The reaction is described in the present example as taking place in a bed of Portland cement mix. However, the reaction could take place in a variety of beds. The present example takes advantage of properties of cement and the hydration process to create a new methodology of creating three dimensional concrete structures. The cement/aggregate mixture not only reacts with the water to create the concrete structure, but it also serves as the support material in a way that allows the fabrication to be a continuous freeform fabrication as opposed to the layer by layer construction characteristic of many free-form three-dimensional object constructions. The reactive solution, which may be water and an admixture, may be injected into the cement/aggregate powder bed in order to create the concrete structure. Non-dispersive concrete admixtures such as polyacrylamide may be added to better control the dispersion of liquid through the bed. The admixtures may be part of the bed prior to liquid injection or may be added with the injected liquid.

Figure 3:
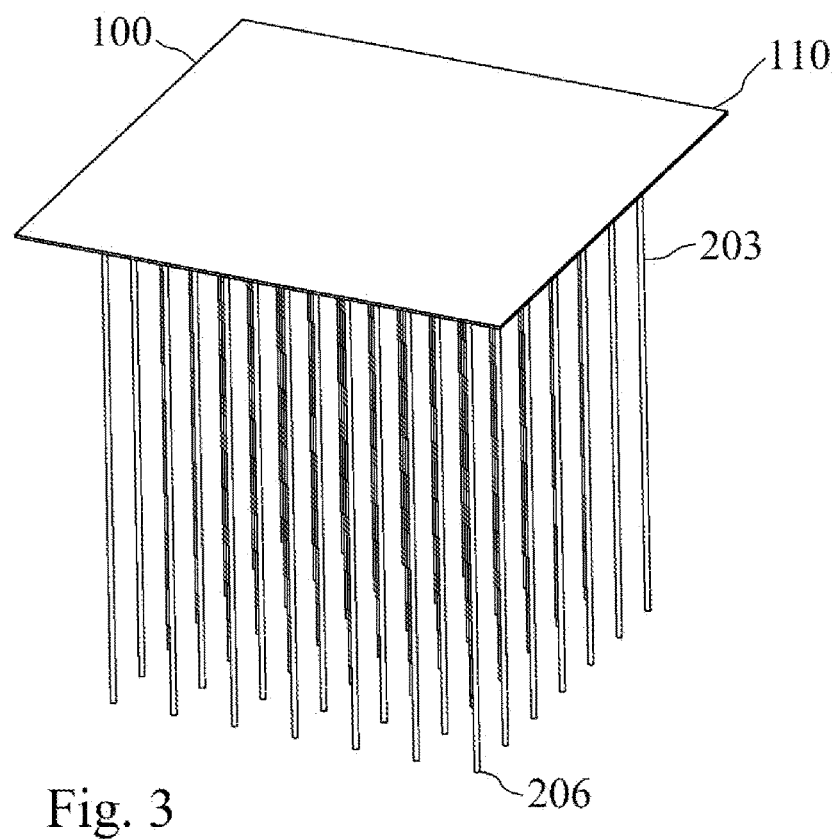
FIG. 3 shows a perspective view of an injection apparatus.
Figure 4:
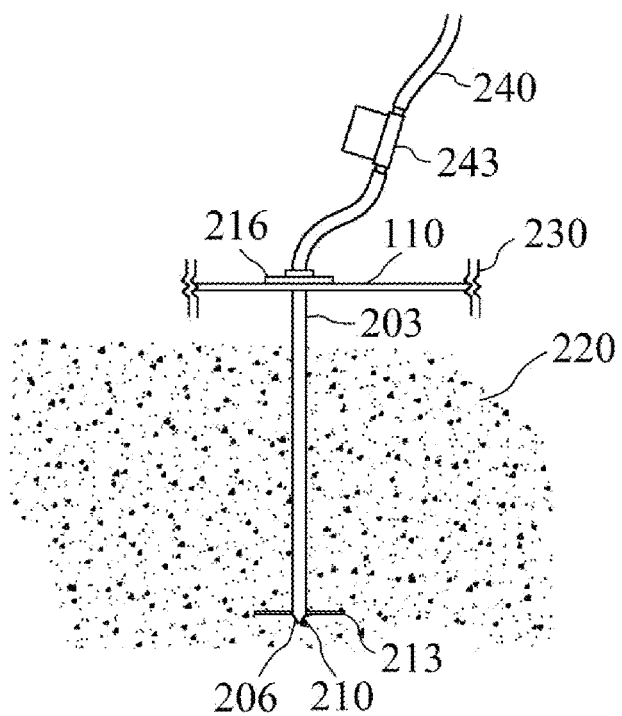
FIG. 4 shows an elevation view of a nozzle configuration.

Referring now to the drawings. FIG. 3 is a perspective view of the injection apparatus and FIG. 4 is an elevation view of a nozzle configuration that is part of the injection apparatus. FIGS. 3 and 4 depict Injection apparatus 100, Injection platform 110, Injection rod 203, Rod end 206, Nozzle 210, Agitation fixture 213, Rod flange 216, Material bed 220, Cut away marking 230, Injection line 240, and Injection pump 243. Not shown in FIG. 3, is the array of tubing, valves and control apparatus associated with the large number of rods that would be typical of substantial arrays. Injection apparatus 100 may have an Injection platform 110 as the structure holding each Injection rod 203 in place so that the injection rods form an array with each Rod end 206 being substantially equally spaced below Injection platform 110. The apparatus may be used to form concrete structures containing Portland cement, a hydraulic cement that sets and hardens through an exothermic chemical reaction known as hydration. Injection line 240 provides liquid which is pumped in a regulated manner by Injection pump 243. Injection pump 243 may be a positive displacement pump such as a peristaltic pump. Alternatively, Injection pump 243 may be replaced with a solenoid valve or other equipment capable of controlling the flow of liquid to the bed. Liquid then passes to Injection rod 203 which is attached to Injection platform 110 by Rod flange 216. Fluid travels through Injection rod 203 to Rod end 206 where it is intermittently dispersed through Nozzle 210. Agitation fixture 213 aids in the distribution of cement or other material in Material bed 220 alleviating potential air pockets within the bed. Cut away marking 230 in FIG. 4 indicates the limited nature of the depiction in FIG. 4, as similar nozzle configurations would typically be adjacent to the depicted nozzle configuration. FIG. 4 is illustrative and not intended to be representative of nozzle spacing. The nozzles may be slit in order to disperse reactive solution and reduce clogging during injection.

Agitation fixture 213 is depicted as rods radiating from Injection rod 203 in FIG. 4. Agitation fixture 213 impacts the movement of the bed near Nozzle 210 influencing the mixture of cement and water at the point of injection and aiding in the removal of voids in the bed. Those projections or other similar projections may enhance the consistency of the final three-dimensional object. A number of other elements could be used to impact the consistency of the final three-dimensional object including air injection ports, cones and other structures.

The abundance of bed material relative to the limited water present may create a water-to-cement (w/c) ratio that is favorable for strong concrete. The calculated water/cement ratio for the voxel freshly removed from the powder bed may range from 0.2 to 0.36, which allows further hydration to maximize strength. When producing a full three-dimensional object according to the presently described methods, at the unreacted cement mix is removed from the three-dimensional object, the water/cement ratio may, for example, be 0.32 with certain examples falling between 0.20 and 0.42 and a significant number of those examples falling between 0.26 and 0.37.

Figure 1:
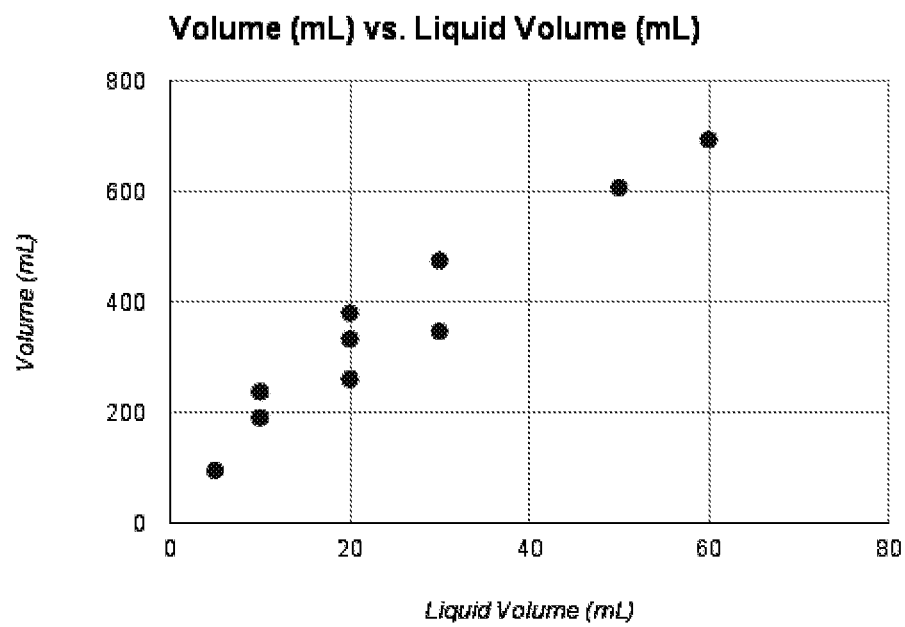
FIG. 1 depicts a graph of voxel volume relative to liquid injection volume.
Figure 2:
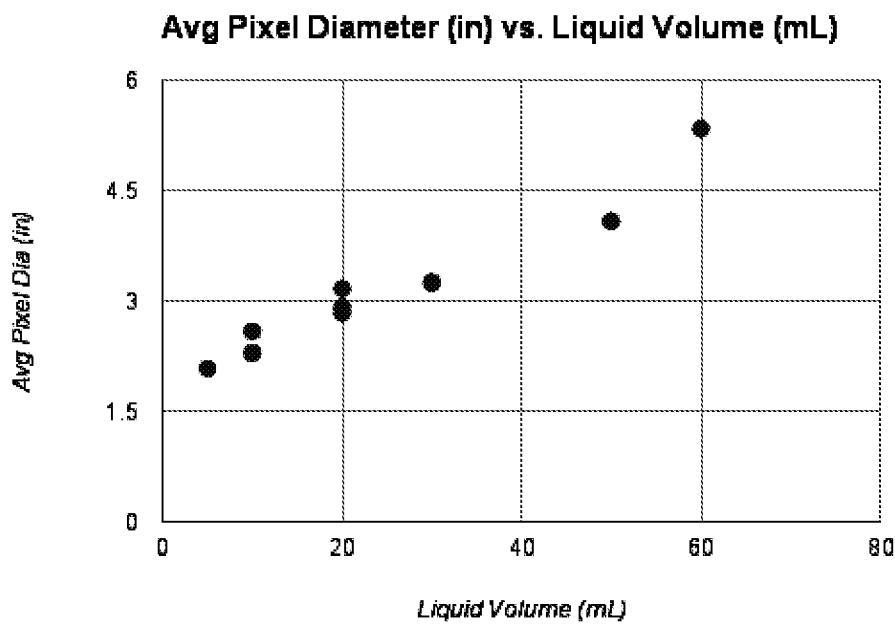
FIG. 2 depicts a graph of voxel diameter relative to liquid injection volume.

The ability to create a complex three-dimensional structure by injecting a reactive solution into a powder bed is dependent on the ability to create a single concrete node or voxel at a specific location within the powder bed. The shape and size of this voxel is dependent on the relationship of diffusion of the reactive solution through the cement/aggregate powder bed and the hydration of the cement. Placing the mixture in a moist environment may increase the hydration process. FIG. 1 of the drawings shows a relationship between the liquid volume of reactive solution injected into the powder bed and the corresponding volume of the solid concrete voxel created for a single voxel as determined by experiment. The diameter of the concrete voxel for the corresponding volume of reactive solution injected in the powder bed is shown in FIG. 2 of the drawings. Experimentally generated voxels tended to be somewhat taller than spherical. Injection parameters may be adjusted to change the shape of the voxels or the algorithm for converting a design into an injection plan may account for and/or manipulate voxel shape. These relationships, from the voxel experiments, empower the ability to create a 3D structure within the powder bed by inserting reactive solution in known amounts at desired locations within the powder bed.

A method for freeform fabrication, using the technique of the present example, may begin with a three-dimensional mesh CAD file or other similar representation of a three-dimensional object. An STL file is an example of such a representation. The representation of the 3D object may then be rasterized into a three-dimensional array of voxels. The three-dimensional array of voxels resulting from the rasterization may, for example have 1s and 0s where the 1s represent solid voxels or injection points and the 0s represent voids or locations which there is no injection. Alternatively, the three-dimensional array of voxels resulting from the rasterization may, be in the form of a quantity of liquid to be injected or injection duration at each point in each level of the bed allowing for the formation of voxels of varying sizes. The array may be broken into a series of two-dimensional sections. Each section may represent a horizontal XY plane of voxels to be printed with the sections being stacked along the Z-axis. The number of voxels in an individual section may correspond to the number of nozzles in the liquid delivery apparatus. The distance between sections along the Z-axis may, for example, be equal to or similar to the distance between adjacent voxels in an individual section. This section thickness may also correspond to the desired voxel size and resolution.

In preparation for the injection procedure, Injection apparatus 100 may be lowered into a powder bed vessel (not shown), which is large enough to contain necessary amounts of cement/aggregate powder to create the desired 3D object. The cement/aggregate powder may then be dispensed into the powder bed vessel through a chute that is attached directly to the injection bed apparatus and manipulated as needed to ensure that the cement/aggregate powder fills the space to be occupied by the printed three-dimensional object. Prior to initiating the injection of reactive solution the nozzles would be at the lowest point in the powder bed vessel. The apparatus includes an injection platform with an array of injection rods. The metering control system actuates the flow of reactive solution delivering a specific volume for each of the injection tubes in the array at each printing layer corresponding to the instructions for the discrete section at each Z-elevation thereby regulating the delivery of the reactive liquid injected into the powder bed at each desired location.

The spacing of the injection rods on the array may correspond to the desired voxel size. The injection platform moves vertically as the reactive solution is dispensed. The vertical movement may start and stop for each section or level being printed or the vertical movement may be continuous with appropriate adjustments to the fluid actuation. When complete, the injection platform may be completely removed from the powder bed vessel. The powder bed vessel may then be moved to an area where it is allowed to set until it is sufficiently hardened. In the meantime, the process can be repeated on another powder bed vessel.

By way of example, a nozzle array with 324 nozzles, utilizing an 18 nozzle by 18 nozzle configuration with 2 inch nozzle center-to-center spacing, could be positioned atop a 3 foot by 3 foot by 3 foot box, which serves as the powder bed. From an initial position, in which each of the nozzles is positioned one inch off of the bottom of the powder bed, a first layer injection could occur. The first layer injection would include injections by each nozzle necessary to match the three-dimensional form of the object ultimately to be printed. After the first injection sequence is complete the nozzle array would be raised by 2 inches for another injection sequence and then raised again for another injection sequence. The pattern would repeat until 18 injection sequences had occurred, after which the nozzle array would be completely removed from the powder bed. At that point, the nozzle array could be cleaned for another use while the three-dimensional object is allowed to cure surrounded by the remainder of the powder bed. The sequencing of the printing is such that multiple complete printing operations involving the nozzle array may occur in the time needed for a single printed three-dimensional object to harden sufficiently that it may be removed from the powder bed. The resulting printed object could be considered as having some fraction of the 5832 available voxels from the three-dimensional printing space. Various embodiments would have significantly greater size, significantly greater voxel density or both.

Once the three-dimensional structure has sufficiently hardened, which depends on the set time of the design mix and the desired strength, the structure can be removed from the powder bed. Approximately 95% of the material not incorporated into the three-dimensional structure can be reused in future fabrication. The remaining partially reacted material can be removed using a low pressure wash of water. The fine and coarse aggregate that comes off during this process can also be reused. The structure may then be placed in moist conditions to allow for further curing.

Example 2

The methods described herein have significant potential application in the area of Geopolymers and in the particular area of geopolymer cement. Geopolymer cement mix may replace Portland cement mix as the powder bed material through which the nozzles are drawn. While there are a variety of geopolymers suitable for the setup described in Example 1, several such examples include alumino-silicate powder and an alkaline reactive solution. In such cases, the alkaline reactive solution would be injected in the same manner as water injection in Example 1.

Example 3

A large variety of additional structures may be placed within the powder bed for ultimate incorporation into the three-dimensional printed object. For example, rebar or other reinforcing materials may be placed between the rods such that the nozzles to create a reinforced three-dimensional structure. Further, utilities such as electrical wiring may be incorporated into the bed and ultimately into the three-dimensional object. Other structures and elements may be incorporated as needed that do not interfere with the path of the nozzles through the bed.

Methods of printing three dimensional structures described herein may, for example, comprise positioning a first nozzle within a bed of loose solid material; positioning a second nozzle within the bed of loose solid material; moving the first nozzle along a first path through the bed of loose solid material; moving the second nozzle along a second path through the bed of loose solid material; emitting a first liquid from the first nozzle into the first path; emitting a second liquid from the second nozzle into the second path; reacting the first liquid and the second liquid with a first portion of the bed of loose solid material thereby forming a solid three-dimensional object that is solid within 36 hours of the emitting of the first liquid and curing the solid three-dimensional object to a hardness of at least 100 psi such that the bed of loose solid material initially contains an unreacted cement composition. In a related example, the first liquid may contact the second liquid. In a related example, the solid three-dimensional object may contain a substantial void along the first path. In a related example, the unreacted cement composition may contain Portland cement. In a related example, the unreacted cement composition may contain geopolymer cement. In a related example, the unreacted cement composition may comprise a cement ingredient selected from calcined clay, slag-based geopolymer cement, rock-based geopolymer cement and fly ash-based geopolymer cement. In a related example, the solid three-dimensional object may have an outer boundary created at the furthest extent of travel of the first liquid in the bed of loose solid material. In a further related example, the method may include the step of converting a plan for a three-dimensional object into an injection plan. In a further related example, a majority of the first liquid may become a part of the three-dimensional object. In a further related example, the method may include the step of removing a second portion of the bed of loose solid material from the solid three-dimensional object and the second portion of the bed of loose solid material may be at least 10% of the bed of loose solid material. In a further related example, the bed of loose solid material may be flowable. In a further related example, the method may comprise including a falsework in the bed of loose solid material and removing the falsework from the solid three-dimensional object. The solid three-dimensional object may have a compressive strength of at least 250 psi. Measurements of compressive strength as used herein refer to ASTM 39 Standard Test Method for Compressive Strength of Cylindrical Concrete Specimens as may be most closely replicated from the powder bed application.

Methods of printing three dimensional structures described herein may, for example, comprise positioning an array of nozzles within a bed of loose solid material; moving the array of nozzles through the bed of loose solid material while injecting a liquid from the array of nozzles in a controlled pattern causing the liquid to react with a first portion of the bed of loose solid material forming a solid three-dimensional object; and removing an unreacted portion of the bed of loose solid material from the solid three-dimensional object such that the bed of loose solid material initially contains an unreacted cement composition. In a related example, the solid three-dimensional object may contain a substantial void along the first path. In a related example, the unreacted cement composition may contain Portland cement. In a related example, the unreacted cement composition may contain geopolymer cement. In a further related example, method may contain the step of converting a plan for a three-dimensional object into an injection plan. In a still further related example, a majority of the liquid may become a part of the three-dimensional object.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

The invention claimed is:

1. A method of printing three dimensional structures comprising:
   a) positioning a first nozzle within a bed of loose solid material;
   b) positioning a second nozzle within the bed of loose solid material;
   c) moving the first nozzle along a first path through the bed of loose solid material;
   d) moving the second nozzle along a second path through the bed of loose solid material;
   e) emitting a first liquid from the first nozzle into the first path;
   f) emitting a second liquid from the second nozzle into the second path;
   g) reacting the first liquid and the second liquid with a first portion of the bed of loose solid material thereby forming a solid three-dimensional object that is solid within 36 hours of the emitting of the first liquid and
   h) curing the solid three-dimensional object to a hardness of at least 100 psi;
   i) wherein the bed of loose solid material initially contains an unreacted cement composition.

2. The method of claim 1 wherein the first liquid contacts the second liquid.

3. The method of claim 1 wherein the solid three-dimensional object contains a substantial void along the first path.

4. The method of claim 1 wherein the unreacted cement composition comprises Portland cement.

5. The method of claim 1 wherein the unreacted cement composition comprises geopolymer cement.

6. The method of claim 1 wherein the unreacted cement composition comprises a cement ingredient selected from calcined clay, slag-based geopolymer cement, rock-based geopolymer cement and fly ash-based geopolymer cement.

7. The method of claim 1 wherein the solid three-dimensional object has an outer boundary created at the furthest extent of travel of the first liquid in the bed of loose solid material.

8. The method of claim 1 further comprising the step of converting a plan for a three-dimensional object into an injection plan.

9. The method of claim 1 wherein a majority of the first liquid becomes a part of the three-dimensional object.

10. The method of claim 1 further comprising the step of removing a second portion of the bed of loose solid material from the solid three-dimensional object wherein the second portion of the bed of loose solid material is at least 10% of the bed of loose solid material.

11. The method of claim 1 wherein the bed of loose solid material is flowable.

12. A method of printing three dimensional structures comprising:
   a) positioning an array of nozzles within a bed of loose solid material;
   b) moving the array of nozzles through the bed of loose solid material while injecting a liquid from the array of nozzles in a controlled pattern causing the liquid to react with a first portion of the bed of loose solid material forming a solid three-dimensional object; and
   c) removing an unreacted portion of the bed of loose solid material from the solid three-dimensional object;
   d) wherein the bed of loose solid material initially contains an unreacted cement composition.

13. The method of claim 12 wherein the solid three-dimensional object contains a substantial void along the first path.

14. The method of claim 12 wherein the unreacted cement composition comprises Portland cement.

15. The method of claim 12 wherein the unreacted cement composition comprises geopolymer cement.

16. The method of claim 12 further comprising the step of converting a plan for a three-dimensional object into an injection plan.

17. The method of claim 12 wherein a majority of the liquid becomes a part of the three-dimensional object.

18. The method of claim 12 further comprising the steps of including a falsework in the bed of loose solid material and removing the falsework from the solid three-dimensional object.

* * * * *